(No Model.)
N. MITCHELL.
HEN'S NEST.
No. 291,214. Patented Jan. 1, 1884.
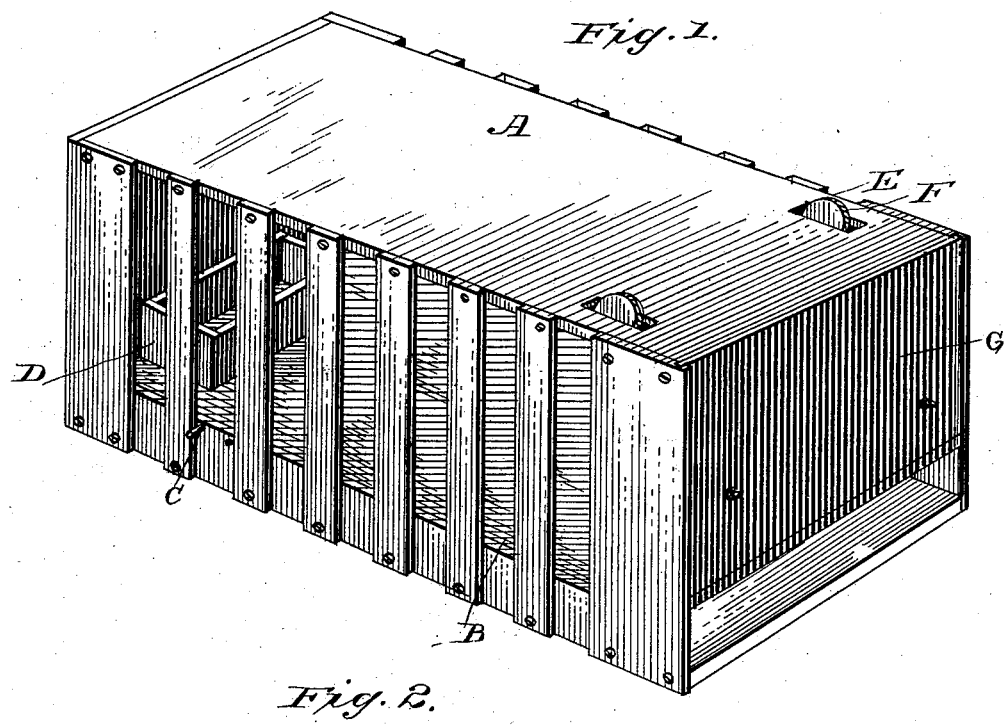
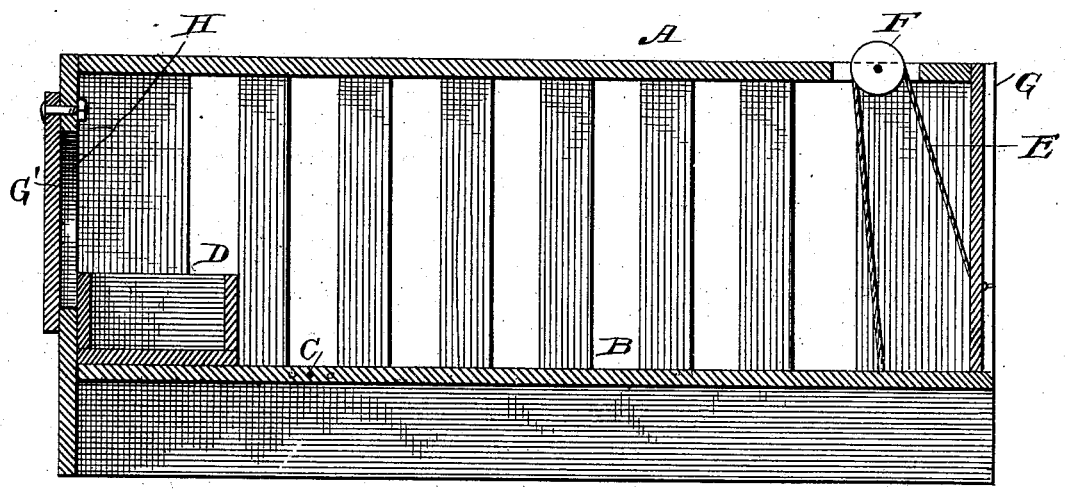
WITNESSES
Chas. H. Baker
E. H. Bradford.
INVENTOR
Nathaniel Mitchell.
H. F. Ennis
Attorney

UNITED STATES PATENT OFFICE.

NATHANIEL MITCHELL, OF SAILOR SPRINGS, ILLINOIS.

HEN'S NEST.

SPECIFICATION forming part of Letters Patent No. 291,214, dated January 1, 1884.

Application filed July 21, 1883. (No model.)

*To all whom it may concern:*

Be it known that I, NATHANIEL MITCHELL, a citizen of the United States, residing at Sailor Springs, in the county of Clay and State of Illinois, have invented certain new and useful Improvements in Hens' Nests, of which the following is a specification, reference being had therein to the accompanying drawings.

This invention relates to certain improvements in hatching nests and coops for hens; and it has for its objects to provide a coop that will be automatically closed when the hen is on her nest, and automatically opened and kept open when she is off, and which can be closed to secure the brood when desired, as more fully hereinafter specified. These objects I attain by the means illustrated in the accompanying drawings, in which—

Figure 1 represents a perspective view of my improved invention, and Fig. 2 a longitudinal vertical section thereof.

The letter A indicates a rectangular chamber, coop, or box, constructed of wood or other material, with slatted sides, after the manner of an ordinary coop. The said chamber is provided with a pivoted floor, B, secured by means of pins C at each side. To the forward end of said floor is secured a nest-box, D, in which the incubation of the eggs is effected. To the rear end of said hinged floor or near the same are secured the lower ends of the cords E, which pass over the pulleys F, secured in slots in the top of the chamber near the rear, and which are connected with a vertically-sliding door, G, at the rear of the chamber, which is adapted to work in vertical grooves in the side walls of said chamber. At the forward end of the chamber is an opening, H, which is provided with a pivoted door, G', by means of which access may be had to the nest on the inside when desired.

The operation of my invention will be understood from the above description, and is as follows: When the hen is upon her nest, the rear door is down, preventing the access of depredatory animals. When she leaves her nest, her weight as she travels to the rear of the hinged bottom causes the rear door to be automatically elevated, so that she can escape from the chamber, and the door will be held in an elevated position until the hen resumes her nest and automatically closes the door. The opening and door at the front are for the purpose of access to the interior of the chamber, and by means of pins the hinged floor may be held when desired, so as to secure the brood in said chamber.

I am aware of the Patent No. 89,626, and do not wish to be understood as claiming such device.

Having thus described my invention, what I claim is—

The combination, with the case or coop A, of the hinged bottom B, provided at its rear end with the nest D and at its forward end with the cords E, secured thereto, passing over the pulleys F, and thence attached to the sliding door G, the whole constructed and arranged substantially as and for the purposes set forth.

In testimony whereof I affix my signature in presence of two witnesses.

NATHANIEL MITCHELL.

Witnesses:
 JOHN W. CULTER,
 S. COKLEY.